United States Patent Office 3,422,320
Patented Jan. 14, 1969

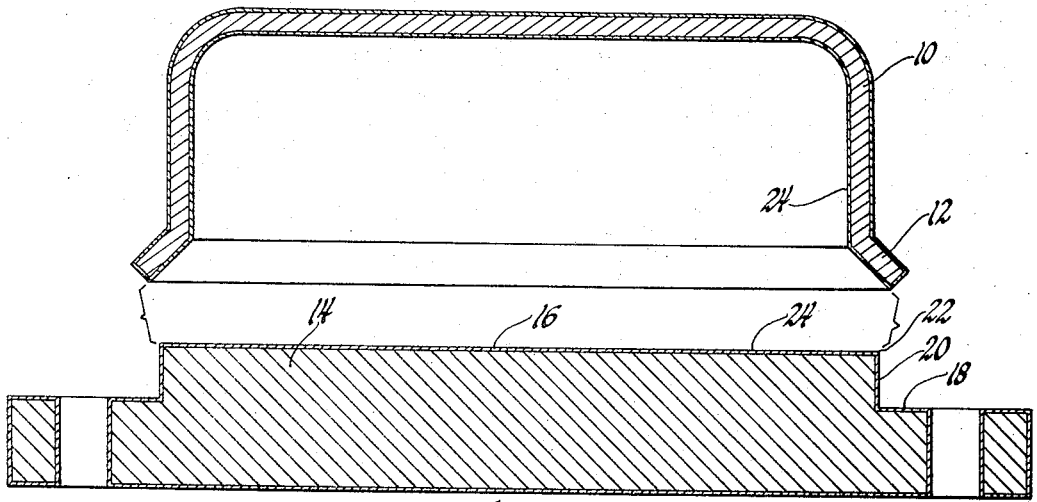
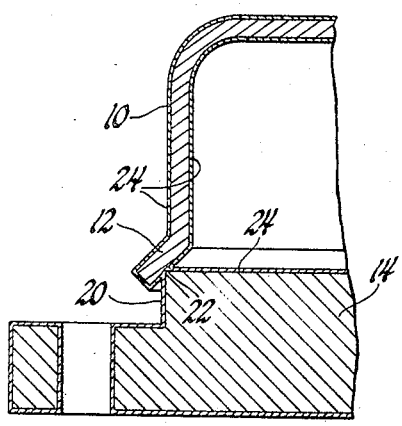
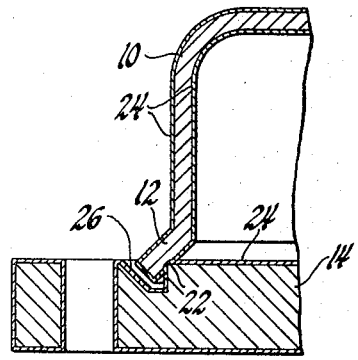
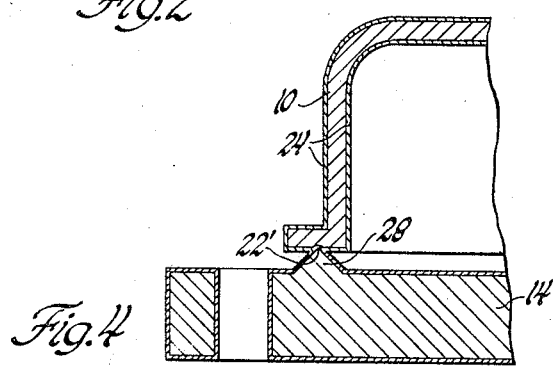
INVENTOR.
Larry R. Woodling
BY
ATTORNEY

3,422,320
SEALING TECHNIQUE FOR COMPOSITE FERROUS-COPPER BASE ALLOY CAPSULES FOR SEMICONDUCTOR DEVICES
Larry R. Woodling, Kokomo, Ind., assignor to General Motors Corporation, Detroit, Mich., a corporation of Delaware
Filed Dec. 23, 1965, Ser. No. 515,947
U.S. Cl. 317—234
Int. Cl. H01l 3/00; 5/00
11 Claims

ABSTRACT OF THE DISCLOSURE

A composite ferrous-copper base alloy capsule for a semiconductor device is sealed in a pressure soldering operation which is performed under resistance welding conditions. In an example, solder is positioned in the interface between a steel capsule cover flange and a sharp corresponding circular projection of a copper capsule base. While pressure is applied electric current is passed between the steel and copper, fusing the solder, to bond the copper and steel together. In this manner a flanged, cup-shaped cover element can be simply, reliably and consistently bonded to a correspondingly circular sharp edge projecting from a copper base member to form a strong, gas-tight enclosure.

---

This invention relates to semiconductor devices and more specifically to an improved capsule for semiconductor devices, as well as to an improved method of making such a capsule.

Both steel and copper have been used as capsule materials for semiconductor signal translating devices. Where steel cannot be used, because of its low heat transfer characteristics, it is replaced by copper. However, even when a capsule base must be made from copper, it may still be preferred to use steel for the cover. Unfortunately, the bonding of a steel cap to a copper base presents a problem. The known and accepted techniques for bonding steel to copper are all unsatisfactory for one reason or another. However, I have found a novel, simple, economical, and reliable bonding technique that is highly satisfactory for semiconductor device encapsulation.

It is, therefore, an object of my invention to provide a semiconductor device encapsulated in a composite steel-copper enclosure. It is a further object of my invention to provide a simple, economical, and reliable method of making such an article.

These and other objects, features and advantages of the invention will become more apparent from the following description of preferred embodiments thereof and from the drawing, in which:

FIGURE 1 shows a sectional view of a steel cap and copper base ready for bonding in accordance with my invention;

FIGURE 2 shows a partial sectional view of the cap and base shown in FIGURE 1, after bonding;

FIGURE 3 shows a partial sectional view of a modification of my invention in which the steel cap is recessed within the upper surface of the base; and FIGURE 4 shows a partial sectional view of another modification of the invention.

I encapsulate the semiconductor in a unique but simple pressure soldering operation that is performed under resistance welding conditions. Solder is positioned in the interface between a steel capsule cover flange and a sharp corresponding circular projection of a copper capsule base. While pressure is applied, current is passed between the steel and copper, fusing the solder, to bond the copper and steel together. In this manner a flanged, cup-shaped cover element can be simply, reliably and consistently bonded to a corresponding circular, sharp edge projecting from a coper base member to form a strong gas-tight enclosure.

Reference is now made to FIGURE 1 of the drawing which shows a cup-shaped steel cover element 10 having a lip flange 12 flared at approximately 45 degrees. A copper base element 14 has its upper surface 16 peripherally relieved at 18 to provide a circular shoulder 20. The shoulder 20 provides a sharp circular edge 22 projecting from surface 16 for substantially a line contact with cover flange 12. Both the cover 10 and base 14 have a low temperature melting metal coating 24, such as tin.

Serving as a preferred specific example of the invention, I have bonded a cold rolled steel cover to an oxygen-free copper base to form a circular enclosure about one-half inch in diameter. A cup having a diameter of about 0.480 inch and a 0.035 inch lip flange flared outwardly at 45 degrees was formed from 0.010 inch cold rolled sheet steel. A circular land area of 0.5 inch in diameter was formed on a 0.09 inch thick base of oxygen-free copper by relieving the periphery of the upper surface of the base to a depth of about 0.04 inch. Both the cover and the base were completely tin plated electrolytically to provide an overall coating thickness of about 0.00003 inch.

The tin plated copper base element 14 was placed on a flat conventional electrode for hot welding steel. The lip flange 12 of the cover element was positioned on shoulder 20 of the base member as shown in FIGURE 2. An annular hot welding die was pressed against the upper surface of the cover flange 12 and the parts were then subjected to electrical conditions similar to what might be expected for hermetically sealing together steel parts of the same general physical characteristics. The steel flange was heated to a softening temperature and the tin plate fused in the line contact area 22 with the base to bond the cover and base together. In addition, the shoulder 20 of the copper base was embedded within the softened flange 12. After the welding current surge subsided, and the assembly cooled, the welding pressure on the electrodes was released.

The base member 14 preferably is of pure copper, but copper base alloys, those alloys containing more than 50% copper, can also be used. The projection must form substantially a line contact with the cover flange. It is most conveniently a sharp edge of a surface on the base member. The sharp edge can be at the periphery of the base, but preferably lies sufficiently within it to prevent an overhang of the cover flange. This is accomplished simply by relieving the surface of the base at its periphery. Even greater protection of the flange 12 is achieved if it is recessed in an annular groove 26 in the surface of the base, as shown in FIGURE 3. Another technique for forming the line contact 22' is shown in FIGURE 4. FIGURE 4 shows a partial section of an annular knife edge 28 upstanding from the upper surface of the base member 14. However, in all these modifications, the projection is backed up by a large mass of the base member so that the projection can be embedded in the cover flange. In this way the solder bond is further enhanced by a widening of the solder joint and even perhaps a mechanical locking effect. It is also to be appreciated that best results are achieved when the cover is actually cylindrical and the base projection circular. However, the cup and projection can be ovulate, generally rectangular, etc., and that such alternatives are intended to be encompassed by the terms circular, annular, etc., used in the claims.

The invention permits bonding covers of any ferrous base alloy to the copper base member. Ferrous base alloys, of course, are those alloys which contain more than 50% iron, such as steel. The cover must be flanged to make a line contact with the copper base. The angle at which the cover flange is flared depends on the nature of the base member projection. If the projection is a knife edge upstanding on the base, the flange can be flared to 90 degrees. However, if one is bonding to an edge of the base surface, I prefer a 45 degree flare, as shown in FIGURES 1, 2 and 3.

It is to be emphasized that while my invention uses a resistance welding technique for bonding, no welding of the copper and steel occurs, nor is there enough heat generated to produce fusion of the iron and copper to bond them directly together. However, if a metallurgically compatible low melting metal, such as a solder, and particularly if tin, is disposed in the interface between the copper and the steel, enough heat can be produced to melt the low melting point metal and produce a strong, gas-tight bond. Moreover, I have found that if this welding current is particularly carefully applied, sufficient heat can be generated to actually soften the steel without appreciably softening the copper. In this manner, under a normal welding pressure, the copper can be embedded within the steel to further enhance the bond by widening it, and perhaps even produce a mechanical locking effect. If the bonding material is especially flowable, it is preferably applied as a thin electrodeposited coating. While it can be applied by various other techniques, electrodeposition has been found to consistently provide extremely durable gas-tight bonds even under commercial production conditions.

While other low temperature melting materials may be useful, I have found that tin as the bonding agent is particularly significantly successful in my invention. Particularly satisfactory results have been obtained when it was applied to both members as an electrodeposited coating having a thickness of about 20–80 millionths of an inch. Lesser thicknesses may not provide adequate coverage of tin on critical areas and greater coating thicknesses can produce problems in soldering the semiconductor wafer to the copper base. However, effective cover-to-base bonding can be achieved with significantly greater tin thicknesses, and in some instances they may be preferred. However, it is generally unnecessary to use tin coating thicknesses in excess of 0.0001 inch.

Although this invention has been described in connection with certain specific examples thereof, no limitation is intended thereby except as defined in the appended claims.

I claim:
1. A method of encapsulating a semiconductor device which comprises forming substantially a line contact between a ferrous metal member and an edge of a copper base alloy member, applying a metallurgically compatible low melting metal to the interface of said line contact, passing electrical current through said interface to fuse said solder without locally melting said ferrous metal member or said copper member, and cooling said members to solidify said metal and bond the members together.

2. The method as defined in claim 1 in which the electrical current passed softens the ferrous metal member and the projection of the copper base alloy member is embedded within it.

3. The method as defined in claim 1 wherein the ferrous metal member is a steel cup-shaped element having an outwardly flared lip flange which is softened and pressed against a generally circular edge on the copper base member to form a sealed enclosure.

4. The method as defined in claim 2 wherein the ferrous metal member is a cup-shaped element having an outwardly flanged lip, the edge of the copper base member is on a shoulder formed by surface relief, and the low temperature melting metal is a tin coating introduced into the bonding interface as a coating on at least one of said members.

5. The method as defined in claim 3 wherein the circular edge is substantially a knife edge upstanding on the surface of the base member.

6. An encapsulated semiconductor device comprising a copper base alloy base member, a generally circular edge on a surface of said base member, a signal translating device on said base member within said surface, a cup-shaped ferrous metal cover member, a flared lip flange on said cover member corresponding to said edge, and said flange soldered to said edge.

7. The encapsulated signal translating device as defined in claim 6 wherein at least one of the circular edge and base flange is tin plated and the circular edge is embedded in the cover flange.

8. An encapsulated signal translating device such as defined in claim 7 wherein said edge is substantially a knife edge upstanding on the surface of the base member and the cover flange is flared to about 90 degrees.

9. The encapsulated signal translating device as defined in claim 7 wherein both the cover member and the base member have a continuous tin coating thereon of a thickness of about 20–40 millionths inch.

10. The encapsulated signal translating device as defined in claim 7 wherein the edge on the base member is a shoulder formed by surface relief and the cover flange is flared at about 45 degrees.

11. The encapsulated signal translating device as defined in claim 10 wherein the surface relief is an annular groove and the cover flange is recessed within it.

References Cited

UNITED STATES PATENTS

| | | | |
|---|---|---|---|
| 2,871,338 | 1/1959 | Broad | 29—492 |
| 3,005,867 | 10/1961 | Green et al. | 317—234 |
| 3,024,299 | 3/1962 | Nijhuis et al. | 317—234 |
| 3,100,927 | 8/1963 | Stelmak | 317—234 |
| 3,178,811 | 4/1965 | Fuller | 317—234 |
| 3,203,083 | 8/1965 | Obenhaus | 29—492 X |
| 3,226,820 | 1/1966 | Anthony et al. | 317—234 |
| 3,296,501 | 1/1967 | Moore | 317—234 |
| 3,348,297 | 10/1967 | Dijkmeijer | 317—234 |

JOHN W. HUCKERT, *Primary Examiner.*

R. F. POLISSACK, *Assistant Examiner.*

U.S. Cl. X.R.

29—492, 502, 588, 589, 591